Feb. 24, 1925. 1,527,553
L. F. HOWARD
ALTERNATING CURRENT GENERATOR
Filed Feb. 28, 1923
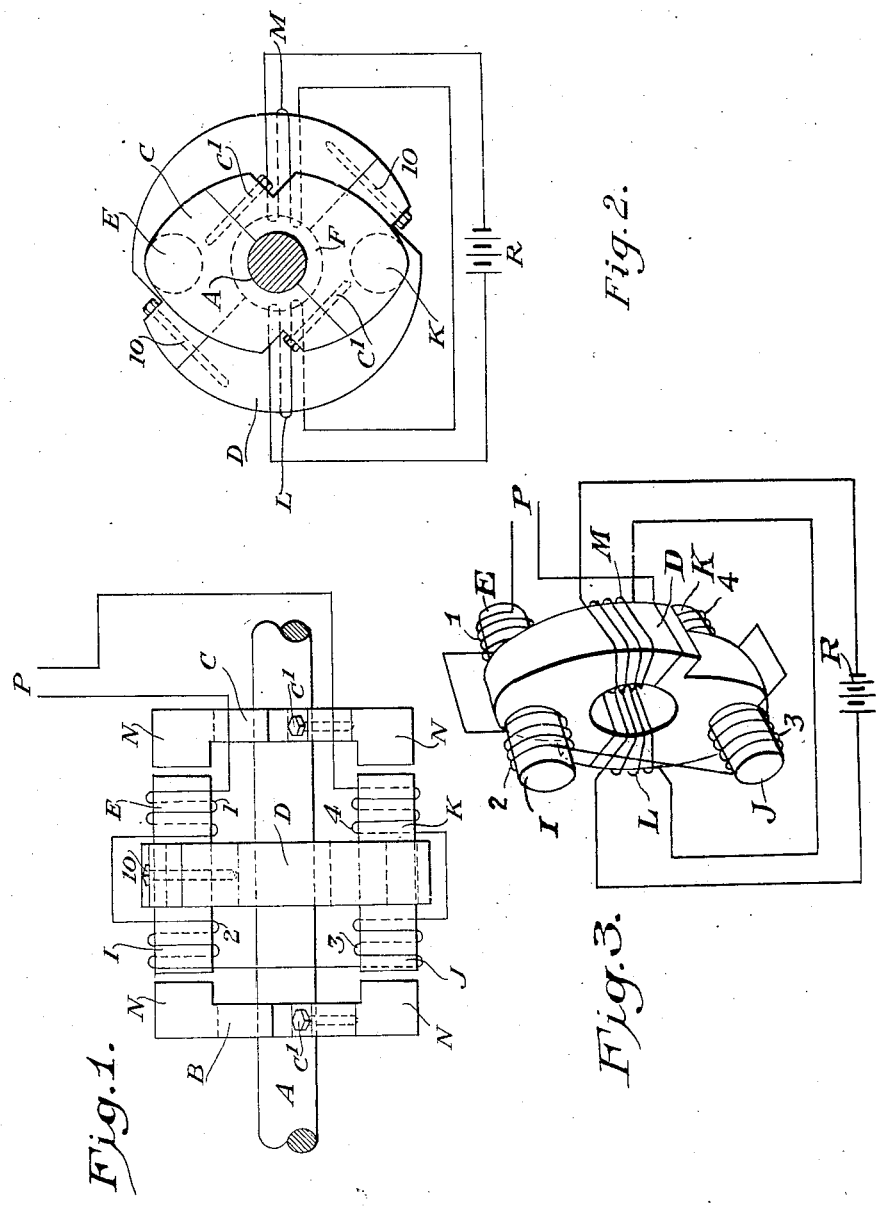
INVENTOR:
L. F. Howard,
BY A. L. Vencill
His ATTORNEY

Patented Feb. 24, 1925.

1,527,553

UNITED STATES PATENT OFFICE.

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ALTERNATING-CURRENT GENERATOR.

Application filed February 28, 1923. Serial No. 621,922.

*To all whom it may concern:*

Be it known that I, LEMUEL F. HOWARD, a citizen of the United States, residing at Edgewood Borough, in the county of Allegheny and State of Pennsylvania, have invented certain new and useful Improvements in Alternating-Current Generators, of which the following is a specification.

My invention relates to alternating current generators and particularly to generators of the inductor type. Generators constructed in accordance with my invention are particularly adapted for, though in no way limited to, mounting on axles of railway vehicles.

I will describe one form of alternating current generator embodying my invention, and will then point out the novel features thereof in claims.

In the accompanying drawings, Fig. 1 is a view, partly diagrammatic, showing, in front elevation, one form of alternating current generator embodying my invention. Fig. 2 is an end view of the generator shown in Fig. 1.

Fig. 3 is a perspective view showing the manner in which the exciting and generating coils are arranged.

Referring to the drawings, the reference character A designates a rotatable shaft as the axle of a locomotive or other railway vehicle. Supported on this axle and arranged to rotate therewith is a paramagnetic rotor C which is preferably made in two parts which are fastened in place on the axle by means of bolts C' as best shown in Fig. 2. One advantage of this method of construction is that the rotor may be mounted upon the axle without removing the wheels. This rotor comprises a flat plate of elliptical shape which is provided at its extremities with two outstanding projections N so disposed that their axes and the center of the axle A all lie in the same plane. Spaced from this rotor and also fastened to axle A is another rotor B, similar in all respects to rotor C. The two rotors are so disposed that the outstanding projections N on rotor B are opposite the similar projections on rotor C and that these projections face each other.

Interposed between these two rotors is a paramagnetic stator D which is supported on the frame of the vehicle by means not essential to my present invention and omitted from the drawings for the sake of simplicity. The stator is provided with a central aperture F which receives the axle A with considerable clearance. This stator may be made in two parts in the same manner as the rotors B and C to facilitate mounting it in place, the two parts being united by bolts 10. The stator comprises a flat body having a pair of outstanding poles I and E which are oppositely disposed, and a similar pair of poles J and K also oppositely disposed. These poles are so located that when pole I is opposite one projection N on rotor B, the pole J is opposite the other projection N of the same rotor. At the same time poles E and K are opposite the projections N of rotor C.

As shown in Fig. 2 the stator body is provided on its two sides with two windings L and M respectively. These windings are supplied with direct current from some convenient source as a battery R, and are wound in such directions that if the magnetic flux in the left hand side of the stator is directed upwardly, the flux in the right hand side is also directed upwardly. When the parts are in the positions shown in the drawing, the flux so generated passes up both sides of the stator body and at the top divides, part passing through pole E, rotor C, and pole K, back into the stator body, and part through pole I, rotor B and pole J back to the stator body. Since the stator body is rigidly attached to the frame of the vehicle and the rotors are rigidly attached to the axle, these members will suffer relative displacement as the axle rotates during motion of the vehicle. When the rotors are in the positions shown in the drawing, the rotor bodies and the projections thereon are parts of the magnetic circuits and considerably reduce the reluctance of these circuits. When the rotors are at 90 angular degrees from these positions, the flux must pass through a large air gap on each side of the stator and the reluctance of the magnetic circuits is considerably higher. Hence as the projections of the rotor elements move successively into and out of alignment with the poles of the stator the flux in the stator body and poles is successively increased and diminished. I propose to utilize this phenomenon for generating alternating current by providing the poles E, I, J and K with windings 1, 2, 3 and 4, respectively, which windings are connected in series and are wound in such directions that the voltages induced in the four windings at a given instant are additive. These windings I shall collectively term the alternating current coil. As long as the windings L and M are supplied with direct current and rotors B and C rotate with respect to stator D, an alternating voltage will be generated in this coil which voltage will furnish an alternating current to a suitable device connected across its terminals as at P. Thus, when the projections on the rotors are opposite the poles on the stator the value of magnetic flux through these poles is at a maximum but its rate of change is zero. As the projections on the rotors move away from alignment with the stator poles the flux diminishes at an increasing rate, thus inducing an increasing voltage of a given polarity in the alternating current coil. When the rotor projections have moved 90 angular degrees from the stator poles, the value of the flux is a minimum but the rate of change of flux is zero, therefore this rate must have reached a maximum and decreased. The increase, maximum and decrease in the rate of change of flux corresponds to the alternating induced electromotive force which also grows to a maximum and decreases to zero. Now as the rotors continue to move in the same direction, the flux begins to increase again and the increasing rate of change causes an increasing induced voltage which reaches a maximum and again decreases to zero but in this case the voltage is in the opposite direction since it is induced by an increasing flux instead of a decreasing flux. When the rotors have moved through 180 angular degrees they again bring their projections into line with the stator poles and the cycle is repeated. It is therefore clear that there is generated in the windings 1, 2, 3 and 4 an alternating electromotive force whose frequency is directly proportional to the speed of rotation of the axle A.

Although I have herein shown and described only one form of alternating current generator embodying my invention, it is understood that various changes and modifications may be made therein within the scope of the appended claims without departing from the spirit and scope of my invention.

Having thus described my invention, what I claim is:

1. In combination, a rotatable axle, a stator having an annular ring of paramagnetic material made in two separate parts adapted to be clamped around the axle, two coils wound in opposite directions on opposite sides of said ring, a circuit for said coils in series including a source of direct current, and means responsive to variations in magnetic flux through said ring for producing an alternating electromotive force.

2. In combination, a rotatable axle, a stator having an annular ring of paramagnetic material made in two parts adapted to be clamped around the axle but spaced therefrom, two coils wound in opposite directions on opposite sides of said ring, a circuit for said coils in series including a source of direct current, outstanding poles of paramagnetic material located on said ring midway between said coils, means for periodically moving a paramagnetic member adjacent the said poles thereby periodically varying the magnetic flux through said poles, and means responsive to variations in magnetic flux through said poles for producing an alternating electromotive force.

3. In combination, a rotatable axle, a stator member having an annular ring of paramagnetic material made of two parts adapted to be clamped around said axle, a magnetic circuit including both sides of said ring in parallel and an air gap, means for producing magnetic flux in said circuit, two outstanding poles on said ring, a rotor element made of two parts adapted to be clamped to said axle and having outstanding projections arranged to periodically come opposite said poles whereby the reluctance of said circuit is considerably decreased and the magnetic flux in said circuit is correspondingly increased, and a winding of wire on each said pole so connected that the voltages induced at any instant by the change in said flux are additive.

4. An alternating current generator comprising a rotatable axle, a stator having an annular ring of paramagnetic material consisting of two parts adapted to be clamped together about said axle, two coils wound in opposite directions on opposite sides of said ring, a circuit for said coils in series including a source of direct current, means adapted to be clamped on said axle for periodically varying the flux through said stator, and means on said stator responsive to variations in the flux through the ring for producing an alternating electromotive force.

5. In combination, a rotatable axle, two members of paramagnetic material arranged to be clamped together to form an annular ring having a central aperture capable of receiving the axle with considerable clearance, means for creating a uni-directional flux through said ring, a rotor comprising two parts arranged to be clamped on said axle to periodically vary the flux through the ring, and means responsive to variations in the flux through said ring for creating an alternating electromotive force.

6. In combination, a rotatable axle, a stator element comprising an annular ring of paramagnetic material adapted to be clamped around said axle in spaced relation therewith, means for creating a unidirectional magnetic flux in said ring, a rotor element made in two parts adapted to be clamped to said axle and arranged to periodically vary the flux through said ring, and means responsive to variations in the flux through said ring to create an alternating electromotive force.

7. In combination, a rotatable axle, a stator element comprising an annular ring of paramagnetic material adapted to be clamped around said axle in spaced relation therewith, means for creating a unidirectional magnetic flux in said ring, a rotor element made in two parts adapted to be clamped to said axle and arranged in inductive relation with said stator element to periodically vary the flux therethrough, and means responsive to variations in the flux through said ring to create an alternating electromotive force.

In testimony whereof I affix my signature.

LEMUEL F. HOWARD.